(12) United States Patent
Rung

(10) Patent No.: US 7,857,727 B2
(45) Date of Patent: Dec. 28, 2010

(54) CONCENTRIC JOINT MECHANISM CAPABLE OF ROTATING WITH MULTIPLE DEGREES OF FREEDOM

(75) Inventor: Bi-Jang Rung, Taipei County (TW)

(73) Assignee: Micro-Star Int'l Co., Ltd., Jung-He, Taipei Hsien (TW)

( * ) Notice: Subject to any disclaimer, the term of this patent is extended or adjusted under 35 U.S.C. 154(b) by 187 days.

(21) Appl. No.: 12/257,394

(22) Filed: Oct. 24, 2008

(65) Prior Publication Data
US 2010/0024594 A1    Feb. 4, 2010

(30) Foreign Application Priority Data
Aug. 1, 2008    (TW) ............... 97129303 A (51) Int. Cl.
*F16H 55/32* (2006.01)
(52) U.S. Cl. ............... 476/72; 476/36; 901/29; 74/490.06; 403/76
(58) Field of Classification Search ............... 403/58, 403/74, 76, 94–96; 901/29; 476/36, 38, 476/47, 67, 72, 73; 74/417 XY, 490.03, 74/490.05, 490.06, 579 R, 840
See application file for complete search history.

(56) References Cited
U.S. PATENT DOCUMENTS

| | | | | |
|---|---|---|---|---|
| 892,105 A | * | 6/1908 | White | ............... 248/60 |
| 1,317,903 A | * | 10/1919 | Whimster | ............... 248/541 |
| 3,267,755 A | * | 8/1966 | Isely | ............... 476/11 |
| 3,803,904 A | * | 4/1974 | Diem et al. | ............... 73/640 |
| 3,841,769 A | * | 10/1974 | Bowerman | ............... 403/90 |
| 4,646,581 A | * | 3/1987 | Bondurant | ............... 476/38 |
| 5,419,008 A | * | 5/1995 | West | ............... 16/25 |
| 5,533,418 A | * | 7/1996 | Wu et al. | ............... 74/490.06 |
| 5,645,507 A | * | 7/1997 | Hathaway | ............... 476/47 |
| 6,238,124 B1 | * | 5/2001 | Merlo | ............... 403/93 |
| 6,494,635 B1 | * | 12/2002 | Merlo | ............... 403/90 |
| 7,106,303 B2 | * | 9/2006 | Bricaud et al. | ............... 345/167 |
| 7,310,570 B2 | * | 12/2007 | Wang et al. | ............... 700/245 |

* cited by examiner

*Primary Examiner*—Joshua T Kennedy
(74) *Attorney, Agent, or Firm*—Winston Hsu; Scott Margo (57) ABSTRACT

A concentric joint mechanism includes a frame, a flexible spherical body, a first friction wheel, a first power device, and a fixing device. The flexible spherical body is disposed inside the frame. The first friction wheel is disposed inside the frame and abuts against the flexible spherical body for driving the flexible spherical body to rotate in a first direction. The first power device is connected to the first friction wheel for providing power to the first friction wheel. The fixing device is connected to the frame and abuts against the flexible spherical body for fixing the flexible spherical body inside the frame together with the first friction wheel.

23 Claims, 6 Drawing Sheets

CONCENTRIC JOINT MECHANISM CAPABLE OF ROTATING WITH MULTIPLE DEGREES OF FREEDOM

BACKGROUND OF THE INVENTION

1. Field of the Invention

The present invention relates to a concentric joint mechanism, and more specifically, to a concentric joint mechanism capable of rotating with multiple degrees of freedom.

2. Description of the Prior Art

In general, a traditional robot arm capable of operating with multiple degrees of freedom utilizes a plurality of motors in a tandem manner to simulate motion of human limbs. However, the rotating axis of each motor can not point to the same axis center when the robot arm is operated. Therefore, extra torques may appear on the robot arm. In addition, disposal of the plurality of motors may occupy more space and mutual interference between motors may occur when the robot arm is operated. The said problems may make it difficult to control the robot arm smoothly. Therefore, for making control of the robot arm easier and resolving the mutual interference problem of the robot arm, an electromagnetic induction controlling method appears accordingly. Via magnetic levitation caused by electromagnetic induction, the said method allows motion of the robot arm to have multiple degrees of freedom. However, difficulty in magnetism control and mechanic calculation when an external force is exerted on the robot arm and excessive space occupied by an electromagnetic device make this method incapable of being applied to practical operation.

SUMMARY OF THE INVENTION

The present invention provides a concentric joint mechanism capable of rotating with multiple degrees of freedom comprising a frame; a flexible spherical body disposed inside the frame; a first friction wheel disposed inside the frame and abutting against the flexible spherical body for driving the flexible spherical body to rotate in a first direction; a first power device connected to the first friction wheel for providing power to rotate the first friction wheel; and a fixing device connected to the frame and abutting against the flexible spherical body for fixing the flexible spherical body inside the frame together with the first friction wheel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
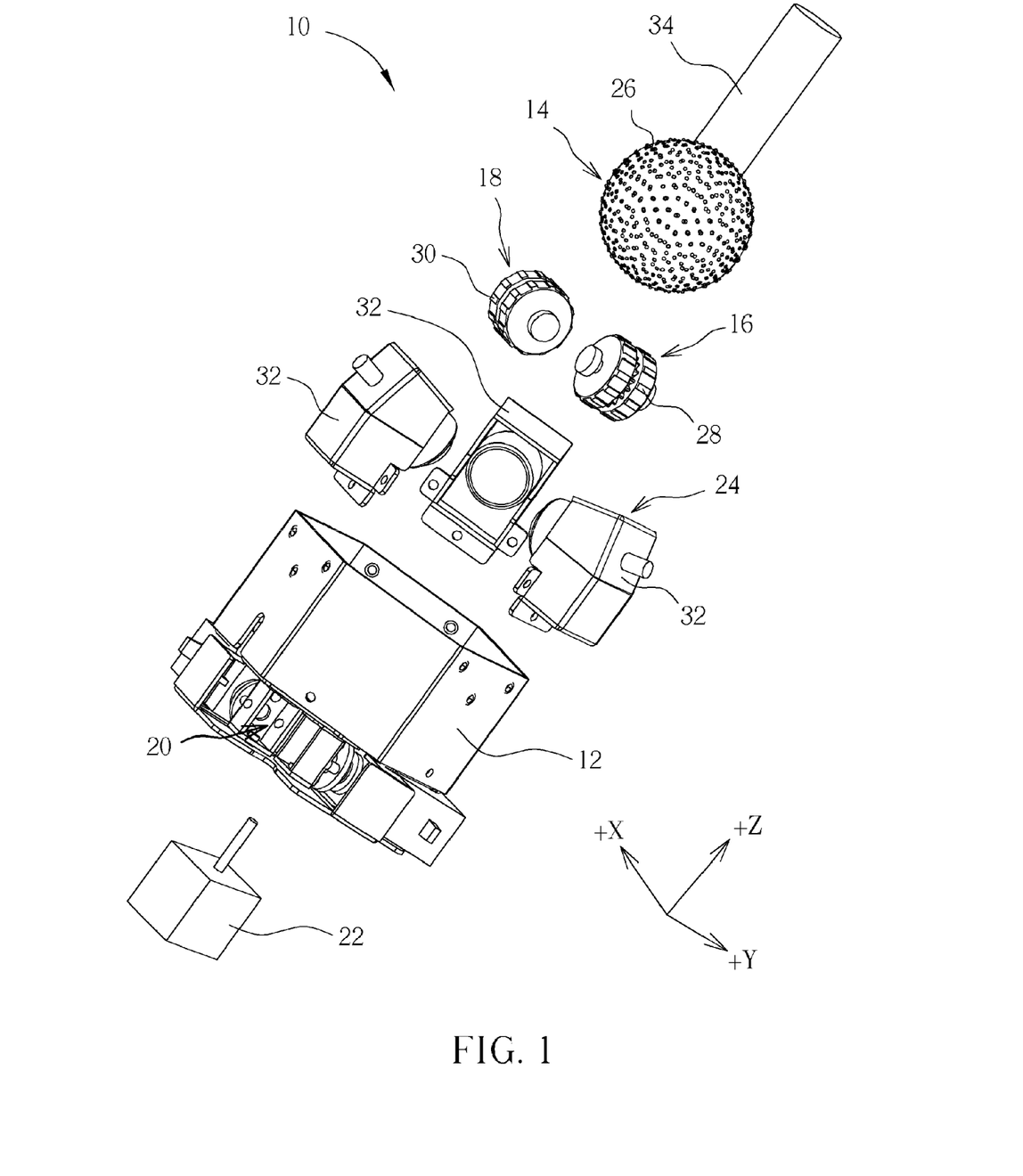
FIG. 1 is an exploded diagram of the concentric joint mechanism according to the present invention.
Figure 2:
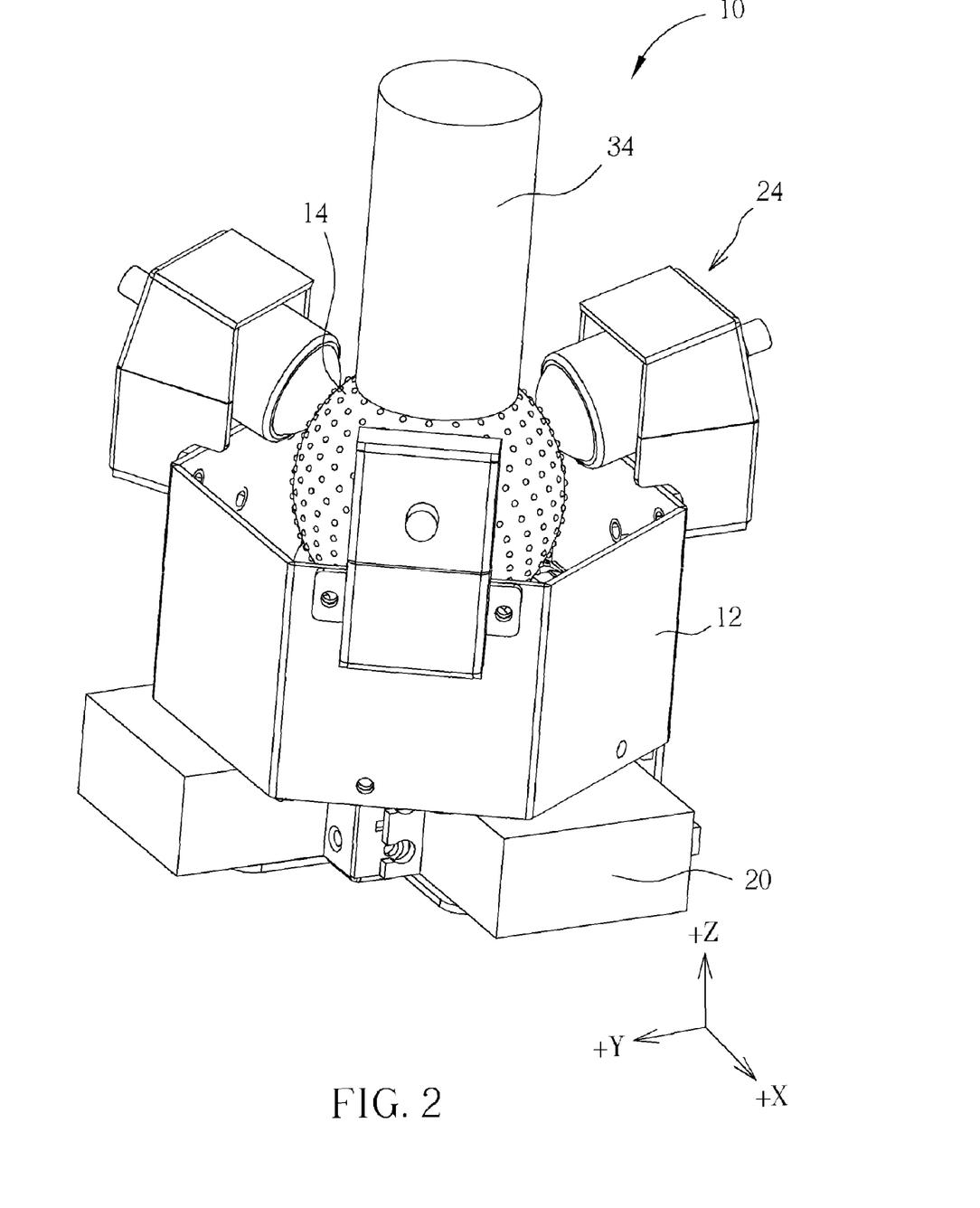
FIG. 2 is an assembly diagram of the concentric joint mechanism in FIG. 1.
Figure 3:
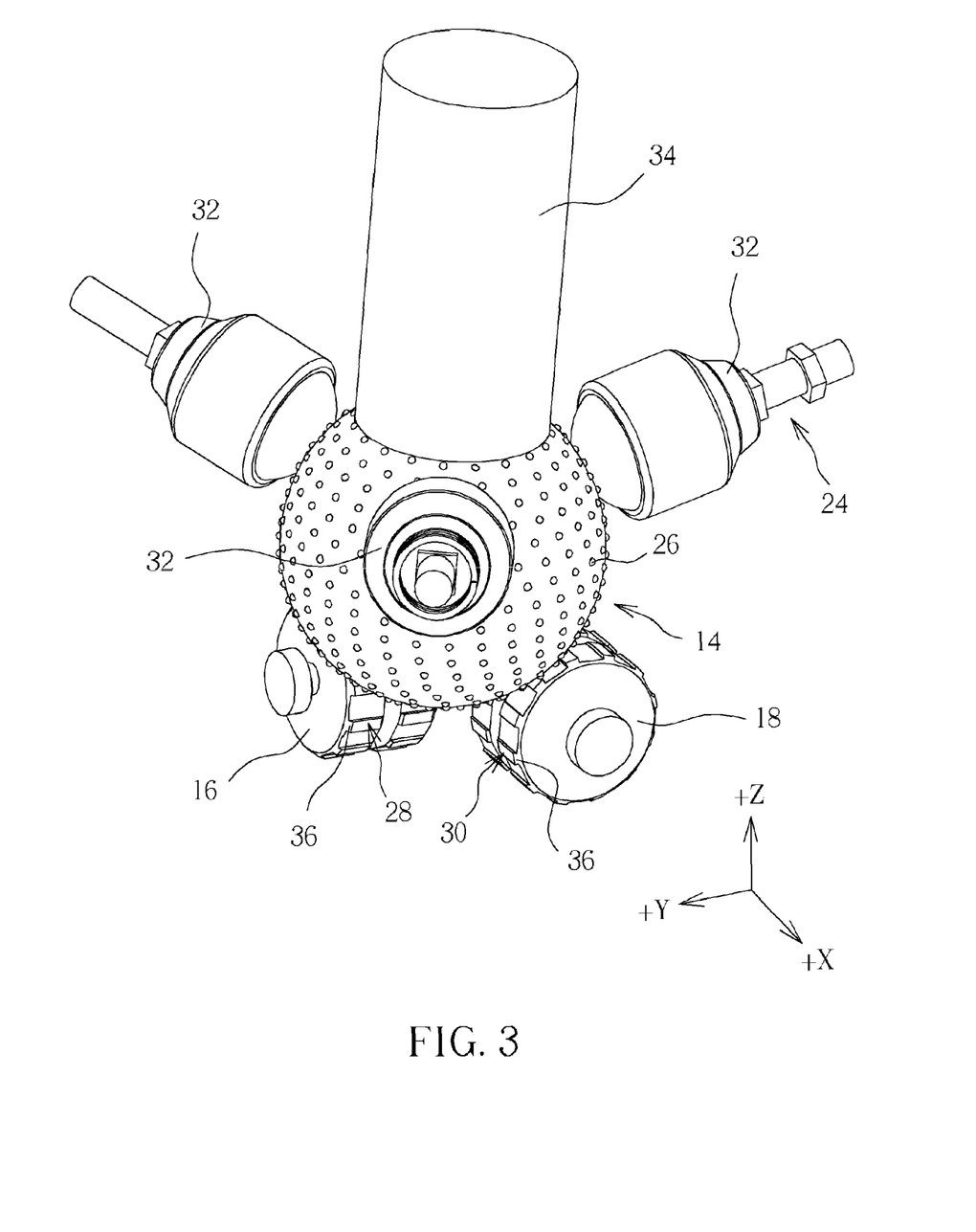
FIG. 3 is an enlarged assembly diagram of the flexible spherical body, the first friction wheel, the second friction wheel, and the fixing device in FIG. 1.
Figure 4:
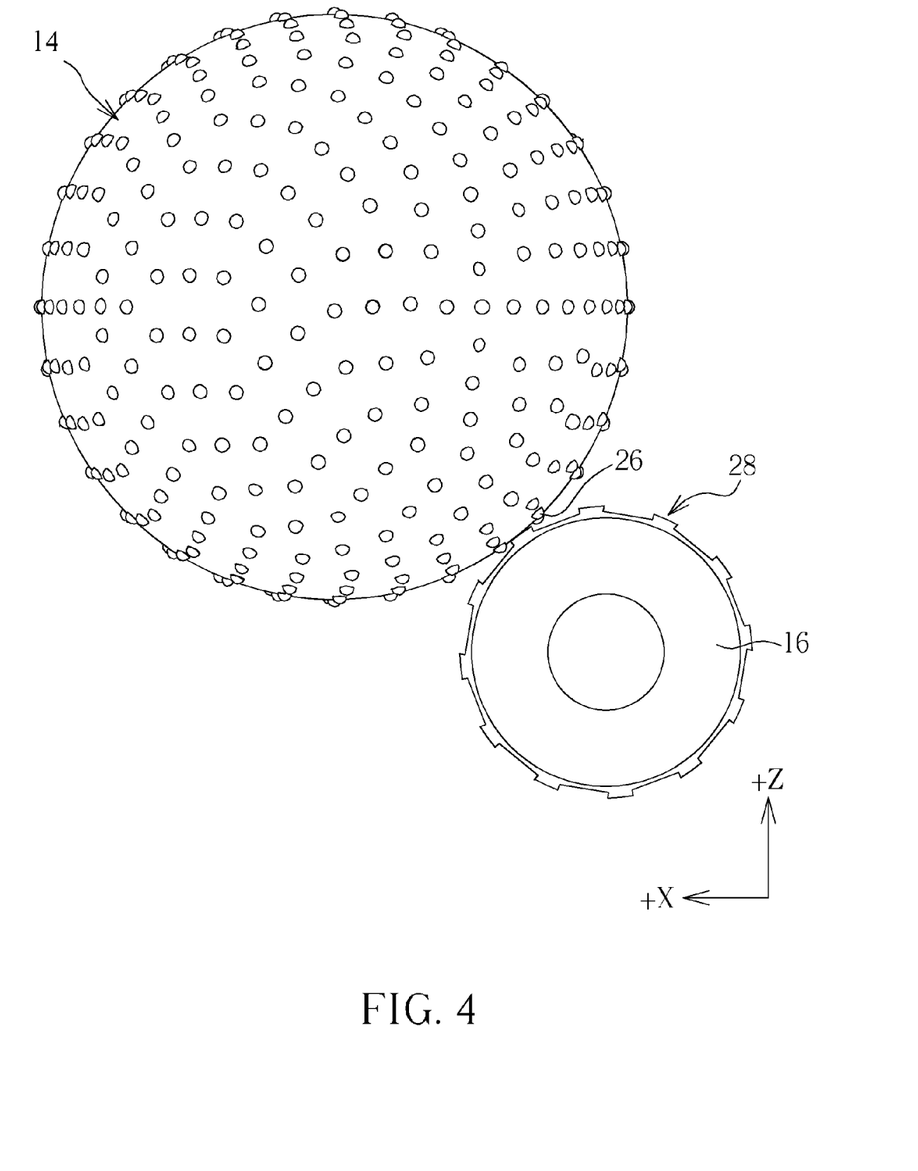
FIG. 4 is a side view of the first friction wheel abutting against the flexible spherical body in FIG. 1.

Please refer to FIG. 1, FIG. 2, FIG. 3, and FIG. 4. FIG. 1 is an exploded diagram of a concentric joint mechanism 10 according to a preferable embodiment of the present invention. FIG. 2 is an assembly diagram of the concentric joint mechanism 10 in FIG. 1. FIG. 3 is an enlarged assembly diagram of a flexible spherical body 14, the first friction wheel 16, the second frictoin wheel 18, and the fixing device 24 in FIG. 1. FIG. 4 is a side view of a first friction wheel 16 abutting against the flexible spherical body 14 in FIG. 1. As shown in FIG. 1, the concentric joint mechanism 10 comprises a frame 12, the flexible spherical body 14, the first friction wheel 16, a second friction wheel 18, a first power device 20, a second power device 22, and a fixing device 24. The flexible spherical body 14 may be made of rubber material. The flexible spherical body 14 is disposed inside the frame 12. A plurality of elastic protruding points 26 is formed on the flexible spherical body 14. The first friction wheel 16 is disposed inside the frame 12 and abuts against the flexible spherical body 14. The first friction wheel 16 is used for driving the flexible spherical body 14 to rotate in a first direction (X-axis shown in FIG. 1 and FIG. 2), meaning that a second direction (Y-axis shown in FIG. 1 and FIG. 2) is taken as a rotating axis of the flexible spherical body 14. A plurality of protruding bars 28 is formed on the first friction wheel 16 corresponding to the plurality of elastic protruding points 26. The plurality of protruding bars 28 is formed around the first friction wheel 16 in a manner of being parallel to a rotating-axis of the first friction wheel 16 (Y-axis shown in FIG. 1). As shown in FIG. 4, a width of each protruding bar 28 is substantially equal to a distance between two adjacent elastic protruding points 26. The second friction wheel 18 is disposed inside the frame 12 and abuts against the flexible spherical body 14. The second friction wheel 18 is used for driving the flexible spherical body 14 to rotate in the second direction (Y-axis shown in FIG. 1 and FIG. 2), meaning that the first direction (X-axis shown in FIG. 1 and FIG. 2) is taken as a rotating axis of the flexible spherical body 14. The second direction is substantially vertical to the first direction, and therefor the flexible spherical body 14 has two degrees of freedom to rotate. Similarly, a plurlaty of protruding bars 30 is formed on the second friction wheel 18 corresponding to the plurality of elastic protruding points 26. The plurality of protruding bars 30 is formed around the second friction wheel 18 in a manner of being parallel to a rotating-axis of the second friction wheel 18 (X-axis shown in FIG. 1). A width of each protruding bar 30 is substantially equal to a distance between two adjacent elastic protruding points 26. The first power device 20 is connected to the first friction wheel 16 and the second friction wheel 18. In this embodiment, the first power device 20 may be a motor for providing power to rotate the first friction wheel 16 and the second friction wheel 18. The second power device 22 is connected to the frame 12. Similarly, the second power device 22 may also be a motor for driving the frame 12 to rotate around the Z-axis shown in FIG. 1. In this embodiment, the fixing device 24 comprises three ball bearings 32. As shown in FIG. 2, three ball bearings 32 abut against the flexible spherical body 14 in a radial shape for fixing the flexible spherical body 14 inside the frame 12 with the first friction wheel 16 and the second friction wheel 18 together. The number of the ball bearings 32 is not limited to three. Furthermore, as shown in FIG. 1, the concentric joint mechanism 10 further comprises a linkage rod 34. The linkage rod 34 is connected to the flexible spherical body 14. As a result, the linkage rod 34 may move with the flexible spherical body 14 when the flexible spherical body 14 rotates, so as to simulate motion of human limbs.

Figure 5:
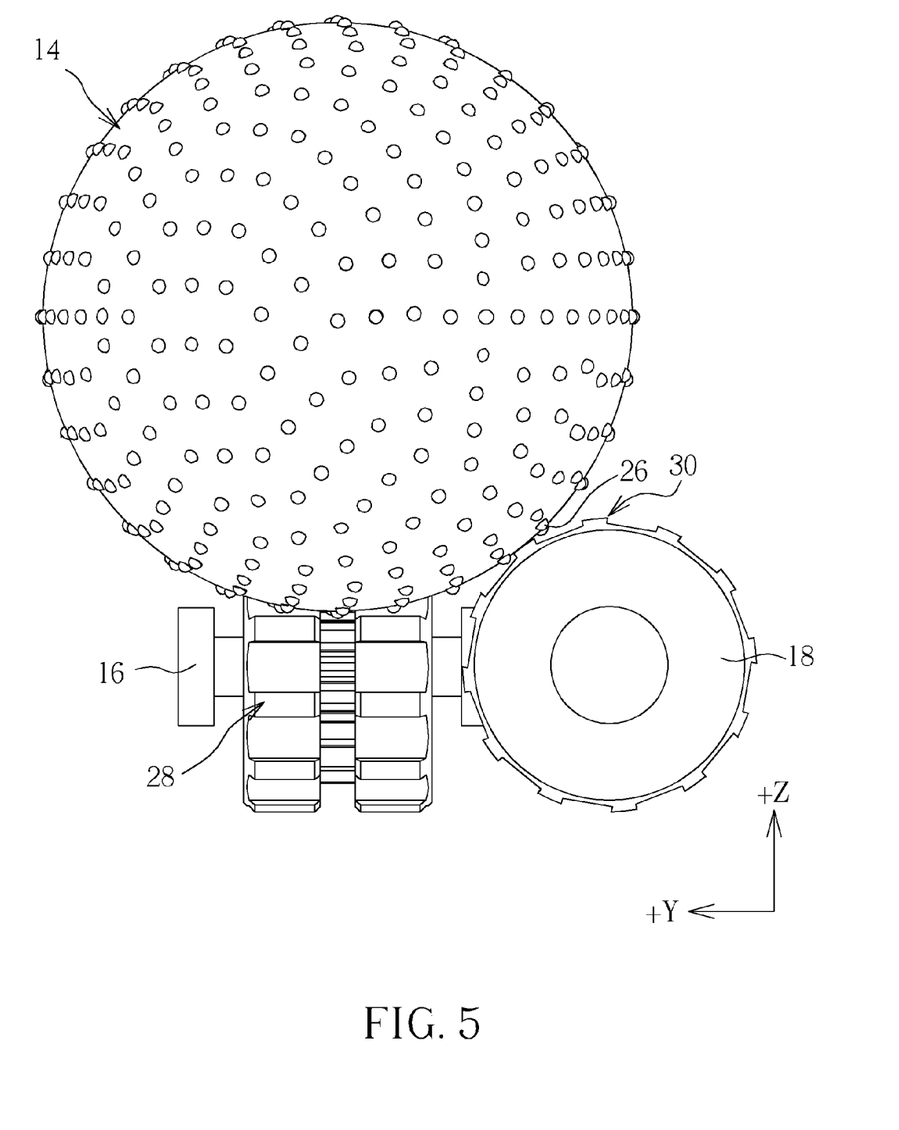
FIG. 5 is a side assembly diagram of the flexible spherical body, the first friction wheel, and the second friction wheel in FIG. 3.

Next, more detailed description for the concentric joint mechanism 10 is provided as follows. To be brief, the concentric joint mechanism 10 may utilize the elastic protruding points 26 to tie in with the protruding bars 28 on the first friction wheel 16 and the protruding bars 30 on the second friction wheel 18, so as to increase the driving force that the driving wheel provides to the flexible spherical body 14 and decrease the friction force between the driven wheel and the flexible spherical body 14 at the same time. Thus, the problem of the friction force between the driven wheel and the flexible spherical body 14 partially reducing the driving force that the driving wheel provides to the flexible spherical body 14 may be improved, and the driving efficiency of the driving wheel relative to the flexible spherical body 14 may be increased. For example, please refer to FIG. 1, FIG. 2, and FIG. 3 at the same time. As shown in FIG. 3, three ball bearings 32 fix the flexible spherical body 14 to a location with the first friction wheel 16 and the second friction wheel 18. Afterwards, if a user wants to drive the flexible spherical body 14 to rotate around the −Y-axis on the XZ plane shown in FIG. 3, the user may just turn on the first power device 20 to drive the first friction wheel 16 to rotate around the +Y-axis (in this case, the first friction wheel 16 is regarded as a driving wheel). At this time, the protruding bars 28 on the first friction wheel 16 may rotate around the +Y-axis with the first friction wheel 16 together. Then, the elastic protruding points 26 on the flexible spherical body 14 may be pushed to rotate with the corresponding protruding bars 28 since the first friction wheel 16 abuts against the flexible spherical body 14, thereby driving the flexible spherical body 14 to rotate around the −Y-axis. When the first friction wheel 16 drives the flexible spherical body 14 to rotate around the −Y-axis, as shown in FIG. 5 which is a side assembly diagram of the flexible spherical body 14, the first friction wheel 16, and the second friction wheel 18 in FIG. 3, the elastic protruding points 26 on the flexible spherical body 14 in contact with the second friction wheel 18 may pass through an interval of two adjacent protruding bars 30 on the second friction wheel 18 (in this case, the second friction wheel 18 is regarded as a driven wheel). That is to say, when the first friction wheel 16 drives the flexible spherical body 14 to rotate around the −Y-axis on the XZ plane shown in FIG. 3, the friction force between the flexible spherical body 14 and the first friction wheel 16 may be increased via the plurality of protruding bars 28 in contact with the plurality of elastic protruding points 26 so as to increase the driving force that the first friction wheel 16 provides to the flexible spherical body 14. At the same time, the friction force between the flexible spherical body 14 and the second friction wheel 18 may be reduced since the elastic protruding points 26 on the flexible spherical body 14 in contact with the second friction wheel 18 may pass through an interval of two adjacent protruding bars 30 on the second friction wheel 18. In such a manner, due to an increase of the friction force between the flexible spherical body 14 and the first friction wheel 16 and a decrease of the friction force between the flexible spherical body 14 and the second friction wheel 18, the driving efficiency of the first friction wheel 16 relative to the flexible spherical body 14 may be increased so that the concentric joint mechanism 10 may control the rotation of the flexible spherical body 14 around the −Y-axis more precisely. On the contrary, if the user wants to drive the flexible spherical body 14 to rotate around the +Y-axis on the XZ plane, the user may just turn on the first power device 20 to drive the first friction wheel 16 to rotate around the −Y-axis. The following process is similar to the said process, and the related description is therefore omitted herein.

Similarly, as mentioned above, if the user wants to drive the flexible spherical body 14 to rotate around the +X-axis on the YZ plane shown in FIG. 3, the user may just turn on the first power device 20 to drive the second friction wheel 18 to rotate around the −X-axis (in this case, the second friction wheel 18 is regarded as a driving wheel). At this time, the protruding bars 30 on the second friction wheel 18 may rotate around the −X-axis together with the second friction wheel 18. Then, the elastic protruding points 26 on the flexible spherical body 14 may be pushed to rotate with the corresponding protruding bars 30 since the second friction wheel 18 abuts against the flexible spherical body 14, thereby driving the flexible spherical body 14 to rotate around the +X-axis. When the second friction wheel 18 drives the flexible spherical body 14 to rotate around the +X-axis, the elastic protruding points 26 on the flexible spherical body 14 in contact with the first friction wheel 16 may pass through an interval of two adjacent protruding bars 28 on the first friction wheel 16 (in this case, the first friction wheel 16 is regarded as a driven wheel). That is to say, when the second friction wheel 18 drives the flexible spherical body 14 to rotate around the +X-axis on the YZ plane shown in FIG. 3, the friction force between the flexible spherical body 14 and the second friction wheel 18 may be increased via the plurality of protruding bars 30 in contact with the plurality of elastic protruding points 26 so as to increase the driving force that the second friction wheel 18 provides to the flexible spherical body 14. At the same time, the friction force between the flexible spherical body 14 and the first friction wheel 16 may be reduced since the elastic protruding points 26 on the flexible spherical body 14 in contact with the first friction wheel 16 may pass through an interval of two adjacent protruding bars 28 on the first friction wheel 16. In such a manner, due to an increase of the friction force between the flexible spherical body 14 and the second friction wheel 18 and a decrease of the friction force between the flexible spherical body 14 and the first friction wheel 16, the driving efficiency of the second friction wheel 18 relative to the flexible spherical body 14 may be increased so that the concentric joint mechanism 10 may control the rotation of the flexible spherical body 14 around the +X-axis more precisely. On the contrary, if the user wants to drive the flexible spherical body 14 to rotate around the −X-axis on the YZ plane shown in FIG. 3, the user may just turn on the first power device 20 to drive the second friction wheel 18 to rotate around the +X-axis. The following process is similar to the said process, and the related description is therefore omitted herein. Furthermore, the said elastic protruding points on the flexible spherical body 14 and the said protruding bars on the first friction wheel 16 and the second friction wheel 18 may be optional structures in the concentric joint mechanism 10. That is to say, the first friction wheel 16 and the second friction wheel 18 may also drive the flexible spherical body 14 to rotate via contacting with the surface of the flexible spherical body directly. In addition, the first friction wheel 16 and the second friction wheel 18 may drive the flexible spherical body 14 to rotate at the same time so as to control the flexible spherical body 14 to rotate in a resultant direction.

In summary, the concentric joint mechanism 10 utilizes the assembly of the flexible spherical body 14, the first friction wheel 16, and the second friction wheel 18 to make the motion of the linkage rod 34 have two degrees of freedom. Furthermore, the second power device 22 may drive the frame 12 to rotate around the Z-axis. Thus, the concentric joint mechanism 10 may make the motion of the linkage rod 34 have three degrees of freedom. In other words, the concentric joint mechanism 10 may simulate most motion of human limbs.

Figure 6:
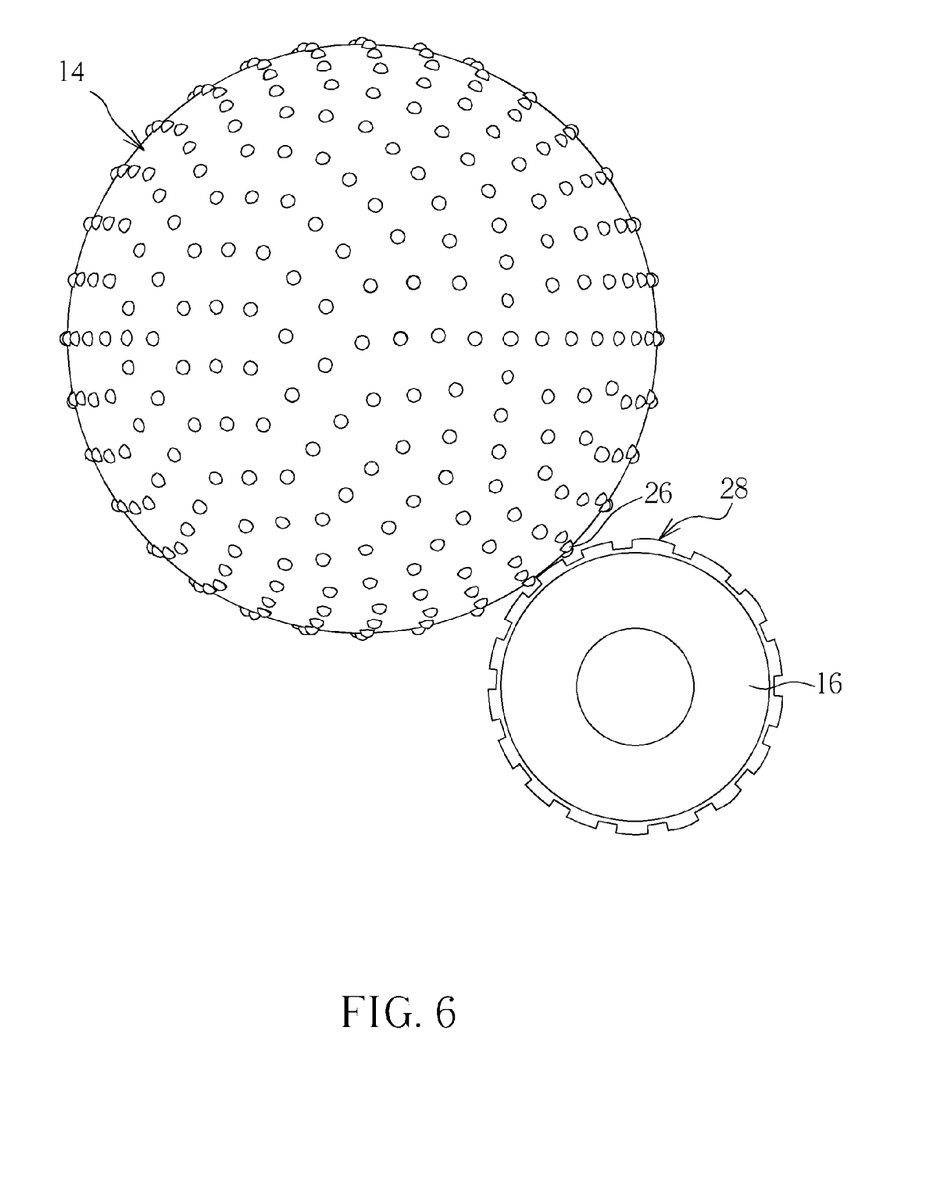
FIG. 6 is a side view of the first friction wheel abutting against the flexible spherical body according to another embodiment of the present invention.

It should be mentioned that structural design of the protruding bars is not limited to the said design. That is to say, the said interval between two adjacent protruding bars may be changed to further increase the driving force that the driving wheel provides to the flexible spherical body 14, or the arrangement of the protruding bars may be changed to further reduce the friction force between the driven wheel and the flexible spherical body 14. For example, as shown in FIG. 6 which is a side view of the first friction wheel 16 abutting against the flexible spherical body 14 according to another embodiment of the present invention, the interval of two adjacent protruding bars may be changed from the distance shown in FIG. 1 to the width of each elastic protruding point for increasing the pushing force that the protruding bars provide to each elastic protruding point; or the arrangement of the protruding bars may be like a tooth arrangement of a common bevel gear, meaning that the protruding bars are formed around the driven wheel in a manner having an included angle with a rotating axis of the driven wheel so as to reduce the friction force between the driven wheel and the flexible spherical body 14.

Furthermore, as shown in FIG. 3, a lead angle 36 is formed respectively on an outer edge of each protruding bar 28 on the first friction wheel 16 and an outer edge of each protruding bar 30 on the second friction wheel 18. The function of the lead angle 36 is described via the following example. Take the first friction wheel 16 as a driving wheel for an example. If the elastic protruding point 26 on the flexible spherical body 14 can not just pass through the interval between two adjacent protruding bars 30 on the second friction wheel 18 when the first friction wheel 16 drives the flexible spherical body 14 to rotate, the concentric joint mechanism 10 may utilize the smooth structural design of the lead angle 36 located at the outer edge of the protruding bar 30 to reduce the resistance that the protruding bar 30 provides to the elastic protruding point 26. Thus, the elastic protruding point 26 may pass through the protruding bar 30 smoothly instead of being blocked. In such a manner, the friction force between the elastic protruding point 26 and the protruding bar 30 may be minimized.

Compared with the prior art utilizing a plurality of motors in a tandem manner or an electromagnetic induction controlling method to simulate motion in multiple degrees of freedom, the concentric joint mechanism 10 of the present invention allows motion of the said linkage rod to have multiple degrees of freedom via the assembly of the flexible spherical body and the friction wheel. In such a manner, both of the said mutual interference problem of motors and the said difficulty in magnetism control and mechanic calculation in the electromagnetic induction controlling method may be avoided, so as to reduce difficulty in controlling a robot arm. In addition, as mentioned above, a plurality of elastic protruding points and a plurality of protruding bars may be added respectively on the flexible spherical body and the friction wheel of the concentric joint mechanism, so as to increase the driving force that the driving wheel provides to the flexible spherical body and decrease the friction force between the driven wheel and the flexible spherical body at the same time. Thus, the driving efficiency of the driving wheel relative to the flexible spherical body may be increased so that the concentric joint mechanism may control the rotation of the flexible spherical body more precisely.

Those skilled in the art will readily observe that numerous modifications and alterations of the device and method may be made while retaining the teachings of the invention.

What is claimed is:

1. A concentric joint mechanism capable of rotating with multiple degrees of freedom comprising:
   a frame;
   a flexible spherical body disposed inside the frame, a plurality of elastic protruding points being formed on the flexible spherical body;
   a first friction wheel disposed inside the frame and abutting against the plurality of elastic protruding points of the flexible spherical body for driving the flexible spherical body to rotate in a first direction;
   a first power device connected to the first friction wheel for providing power to rotate the first friction wheel; and
   a fixing device connected to the frame and abutting against the flexible spherical body for fixing the flexible spherical body inside the frame together with the first friction wheel.

2. The concentric joint mechanism of claim 1, wherein a plurality of protruding bars is formed on the first friction wheel corresponding to the plurality of elastic protruding points, and a width of each protruding bar is substantially equal to a distance between two adjacent elastic protruding points.

3. The concentric joint mechanism of claim 2, wherein a distance between two adjacent protruding bars on the first friction wheel is substantially equal to a width of each elastic protruding point.

4. The concentric joint mechanism of claim 2, wherein the plurality of protruding bars is formed around the first friction wheel in a manner of being parallel to a rotating-axis of the first friction wheel.

5. The concentric joint mechanism of claim 2, wherein the plurality of protruding bars is formed around the first friction wheel in a manner having an included angle with a rotating-axis of the first friction wheel.

6. The concentric joint mechanism of claim 1 further comprising a second friction wheel connected to the first power device and abutting against the plurality of elastic protruding points of the flexible spherical body for driving the flexible spherical body to rotate in a second direction, wherein the first power device is used for providing power to rotate the second friction wheel.

7. The concentric joint mechanism of claim 6, wherein the first direction is substantially vertical to the second direction.

8. The concentric joint mechanism of claim 6, wherein a plurality of protruding bars is formed on the first friction wheel, a width of each protruding bar is substantially equal to a distance between two adjacent elastic protruding points, and the plurality of protruding bars is used for pushing the plurality of elastic protruding points so as to increase the friction force between the first friction wheel and the flexible spherical body.

9. The concentric joint mechanism of claim 8, wherein a distance between two adjacent protruding bars on the first friction wheel is substantially equal to a width of each elastic protruding point.

10. The concentric joint mechanism of claim 8, wherein the plurality of protruding bars of the first friction wheel is formed around the first friction wheel in a manner of being parallel to a rotating-axis of the first friction wheel.

11. The concentric joint mechanism of claim 8, wherein the plurality of protruding bars of the first friction wheel is formed around the first friction wheel in a manner having an included angle with a rotating-axis of the first friction wheel.

12. The concentric joint mechanism of claim 8, wherein a plurality of protruding bars is formed on the second friction wheel, and the elastic protruding points on the flexible spherical body in contact with the second friction wheel may pass through an interval of two adjacent protruding bars on the second friction wheel when the first friction wheel drives the flexible spherical body to rotate in the first direction.

13. The concentric joint mechanism of claim 12, wherein a width of each protruding bar on the second friction wheel is substantially equal to a distance between two adjacent elastic protruding points.

14. The concentric joint mechanism of claim 12, wherein a distance between two adjacent protruding bars on the second friction wheel is substantially equal to a width of each elastic protruding point.

15. The concentric joint mechanism of claim 12, wherein the plurality of protruding bars of the second friction wheel is formed around the second friction wheel in a manner of being parallel to a rotating-axis of the second friction wheel.

16. The concentric joint mechanism of claim 12, wherein the plurality of protruding bars of the second friction wheel is formed around the second friction wheel in a manner having an included angle with a rotating-axis of the second friction wheel.

17. The concentric joint mechanism of claim 12, wherein a lead angle is formed respectively on an outer edge of each protruding bar on the first friction wheel and an outer edge of each protruding bar on the second friction wheel.

18. The concentric joint mechanism of claim 1 further comprising a second power device connected to the frame for driving the frame to rotate in a third direction.

19. The concentric joint mechanism of claim 18, wherein the second power device is a motor.

20. The concentric joint mechanism of claim 1 further comprising a linkage rod connected to the flexible spherical body.

21. The concentric joint mechanism of claim 1, wherein the flexible spherical body is made of rubber material.

22. The concentric joint mechanism of claim 1, wherein the fixing device comprises a plurality of ball bearings abutting against the flexible spherical body in a radial shape.

23. The concentric joint mechanism of claim 1, wherein the first power device is a motor.

\* \* \* \* \*